US009517668B2

(12) United States Patent
Lavoie

(10) Patent No.: US 9,517,668 B2
(45) Date of Patent: Dec. 13, 2016

(54) HITCH ANGLE WARNING SYSTEM AND METHOD

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/668,424

(22) Filed: Mar. 25, 2015

(65) Prior Publication Data

US 2016/0023526 A1    Jan. 28, 2016

Related U.S. Application Data

(60) Provisional application No. 62/029,885, filed on Jul. 28, 2014.

(51) Int. Cl.
    *G06F 17/00*        (2006.01)
    *B62D 13/06*       (2006.01)
    (Continued)

(52) U.S. Cl.
    CPC .............. *B60D 1/305* (2013.01); *B60D 1/06* (2013.01); *B60D 1/62* (2013.01); *B62D 13/06* (2013.01);
    (Continued)

(58) Field of Classification Search
    CPC ............ B60W 10/20; B60W 2710/20; B60W 2420/42; B60W 30/09; B60W 2540/18; B60W 30/06; B60W 50/14; B60W 2300/14; B60W 30/095; B62D 15/025; B62D 15/0285; B62D 13/00
    See application file for complete search history.

(56) References Cited

U.S. PATENT DOCUMENTS 3,542,390 A    11/1970   Fikes et al.
3,605,088 A     9/1971   Savelli
(Continued)

FOREIGN PATENT DOCUMENTS

CN        102582686 B     9/2013
DE          3923676 A1    1/1991
(Continued)

OTHER PUBLICATIONS

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.
(Continued)

*Primary Examiner* — Jerrah Edwards
*Assistant Examiner* — Demetra Smith-Stewart
(74) *Attorney, Agent, or Firm* — Raymond Coppiellie; Price Heneveld LLP

(57) ABSTRACT

A hitch angle warning system includes a camera-based hitch angle sensor that senses a hitch angle between a vehicle and a trailer. The hitch angle warning system also includes a controller that estimates an amount of time for the hitch angle to reach a threshold angle based on a rate of change of the hitch angle. The threshold angle may be set to a maximum hitch angle controllable by the vehicle based on a length of the trailer. The controller thereby generates a warning signal when the amount of time is less than a threshold time, which is configured to be greater or equal to than a response time of a driver of the vehicle to make a corrective action. The warning signal may be deactivated when the amount of time is greater than a second time that is greater than the threshold time.

19 Claims, 12 Drawing Sheets

(51) Int. Cl.
*B60D 1/30* (2006.01)
*B62D 15/02* (2006.01)
*B60D 1/06* (2006.01)
*B60D 1/62* (2006.01)
*B60D 1/24* (2006.01)

(52) U.S. Cl.
CPC ......... *B62D 15/027* (2013.01); *B62D 15/0285* (2013.01); *B60D 1/245* (2013.01); *B60D 1/30* (2013.01); *B60R 2300/307* (2013.01); *B60R 2300/607* (2013.01); *B60R 2300/80* (2013.01); *B60W 2520/22* (2013.01)

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,499 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese et al. |
| 8,192,036 B2 | 6/2012 | Lee et al. |
| 8,215,436 B2 | 7/2012 | Degrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |

(56) References Cited

U.S. PATENT DOCUMENTS

| | | |
|---|---|---|
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,180,890 B2 | 11/2015 | Lu et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2005/0000738 A1 | 1/2005 | Gehring et al. |
| 2005/0128059 A1 | 6/2005 | Vause |
| 2005/0206225 A1 | 9/2005 | Offerle et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0200759 A1* | 7/2014 | Lu .................. B60D 1/245 701/28 |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0002670 A1* | 1/2015 | Bajpai .................. G06K 9/00791 348/148 |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |

(56) References Cited

U.S. PATENT DOCUMENTS

| | | |
|---|---|---|
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0009288 A1 | 1/2016 | Yu |
| 2016/0152263 A1 | 6/2016 | Singh et al. |
| 2016/0153778 A1 | 6/2016 | Singh et al. |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |

OTHER PUBLICATIONS

"Ford Super Duty: Truck Technologies", Brochure, Sep. 2011, 2 pages.

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.

M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.

F.W. Kienhöfer; D. Cebon, "An Investigation of ABS Strategies for Articulated Vehicles", Cambridge University, Engineering Department, United Kingdom, date unknown, 13 pages.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.

Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.

(56) References Cited

OTHER PUBLICATIONS

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (OROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor- Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.
SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

\* cited by examiner

HITCH ANGLE WARNING SYSTEM AND METHOD

CROSS-REFERENCE TO RELATED APPLICATION

This application claims benefit to U.S. Provisional Patent Application No. 62/029,885, entitled "HITCH ANGLE WARNING SYSTEM AND METHOD," filed on Jul. 28, 2014, the entire disclosure of which is hereby incorporated herein by reference.

FIELD OF THE INVENTION

The disclosure made herein relates generally to active safety technologies in vehicles, and more particularly to a trailer backup assist system that is configured with a hitch angle warning system.

BACKGROUND OF THE INVENTION

Reversing a vehicle while towing a trailer can be challenging for many drivers, particularly for drivers that drive with a trailer on an infrequent basis or with various types of trailers. One reason for such difficulty may be that backing a vehicle with an attached trailer requires steering inputs that are opposite to steering inputs when backing the vehicle without a trailer attached to the vehicle. Another reason for such difficulty may be that small errors in steering while backing a vehicle with an attached trailer are amplified, which may cause the trailer to quickly depart from a desired path. Yet an additional reason backing a trailer can prove to be difficult is the need to control the vehicle in a manner that limits the potential for a jackknife condition to occur. These difficulties may also be experienced and in some instances exaggerated when attempting to quickly backup the trailer, especially when switching between various trailers that have a wide variance in how they react to similar steering inputs.

SUMMARY OF THE INVENTION

According to one aspect of the present invention, a hitch angle warning system includes a hitch angle sensor that senses a current hitch angle between a vehicle and a trailer. The hitch angle warning system also includes a controller that determines a future position of the trailer at a set time based on the current hitch angle and a speed of the vehicle. The controller generates a warning signal when the future position exceeds a hitch angle threshold.

According to another aspect of the present invention, a hitch angle warning system includes a hitch angle sensor that senses a hitch angle between a vehicle and a trailer. The hitch angle warning system also includes a controller that estimates an amount of time for the hitch angle to reach a threshold angle based on a rate of change of the hitch angle. The controller generates a warning signal when the amount of time is less than a threshold time.

According to another aspect of the present invention, a method for providing a hitch angle warning includes reversing a vehicle with a trailer attached. The method also includes a step of sensing a hitch angle between the vehicle and the trailer. In addition, the method includes a step of determining an amount of time for the hitch angle to reach a threshold angle. Further, the method includes a step of generating a warning signal when the amount of time is less than a threshold time.

According to a further aspect of the present invention, a hitch angle warning system includes a camera-based hitch angle sensor that senses a hitch angle between a vehicle and a trailer. The hitch angle is representative of the articulation difference between the longitudinal centerlines of the trailer and the vehicle proximate a pivoting ball joint connection. The hitch angle warning system also includes a controller that estimates an amount of time for the hitch angle to reach a threshold angle based on a rate of change of the hitch angle. The threshold angle may be set to a maximum hitch angle controllable by the vehicle based on a length of the trailer. The controller thereby generates a warning signal when the amount of time is less than a threshold time, which is configured to be greater or equal to than a response time of a driver of the vehicle to make a corrective action. The warning signal may be deactivated when the amount of time is greater than a second time that is greater than the threshold time.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
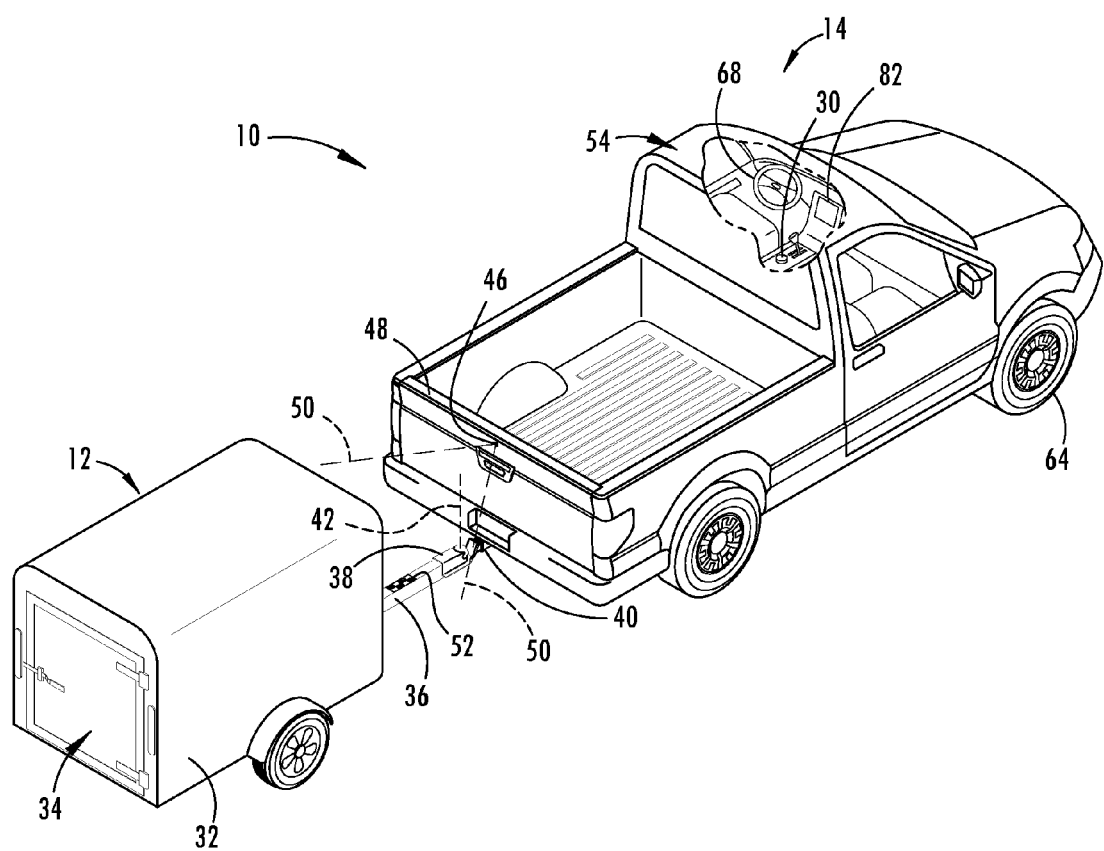
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-13, reference numeral 10 generally designates a trailer backup assist system for controlling a backing path of a trailer 12 attached to a vehicle 14 by allowing a driver of the vehicle 14 to specify a desired curvature or backing path 26 of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. In addition, the trailer backup assist system 10 may include a steering input device 18, such as a rotatable knob 30, for a driver to provide the desired curvature or backing path 26 of the trailer 12. To monitor the position of the trailer 12 relative to the vehicle 14, the trailer backup assist system 10 may include a sensor system 16 that senses a hitch angle γ between the trailer 12 and the vehicle 14, which may be generally referred to as a hitch angle sensor 44. To avoid unacceptable trailer backup conditions, such as a jackknife condition, the hitch angle γ and related information from the hitch angle sensor 44 may be monitored and processed with a warning routine 124 to provide a hitch angle warning system. A hitch angle warning system, according to one embodiment, includes the hitch angle sensor 44 and a controller 28 that estimates an amount of time for the hitch angle γ to reach a threshold angle based on a rate of change of the hitch angle γ. The controller 28 of the hitch angle warning system may generate a warning signal when the amount of time is less than a threshold time to avoid reaching the threshold angle, which may correspond with a jackknife condition. Additional embodiments of the hitch angle warning system may alternatively determine a future position of the trailer at a set time based on the sensed hitch angle, a speed of the vehicle, and a kinematic relationship between the vehicle and the trailer. In such an embodiment, a warning signal may be generated when the future position exceeds the threshold angle to similarly avoid the threshold angle and a potentially corresponding jackknife condition.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a vision-based hitch angle sensor 44 for sensing the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including an imaged scene 126 of the hitch connection and/or an imaged scene of one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, a yaw rate sensor on the trailer 12 and the vehicle 14, energy transducers of a reverse aid system, a blind spot system, and/or a cross traffic alert system, and other conceivable sensors or indicators of the hitch angle γ to supplement or be used in place of the vision-based hitch angle sensor 44.

Figure 2:
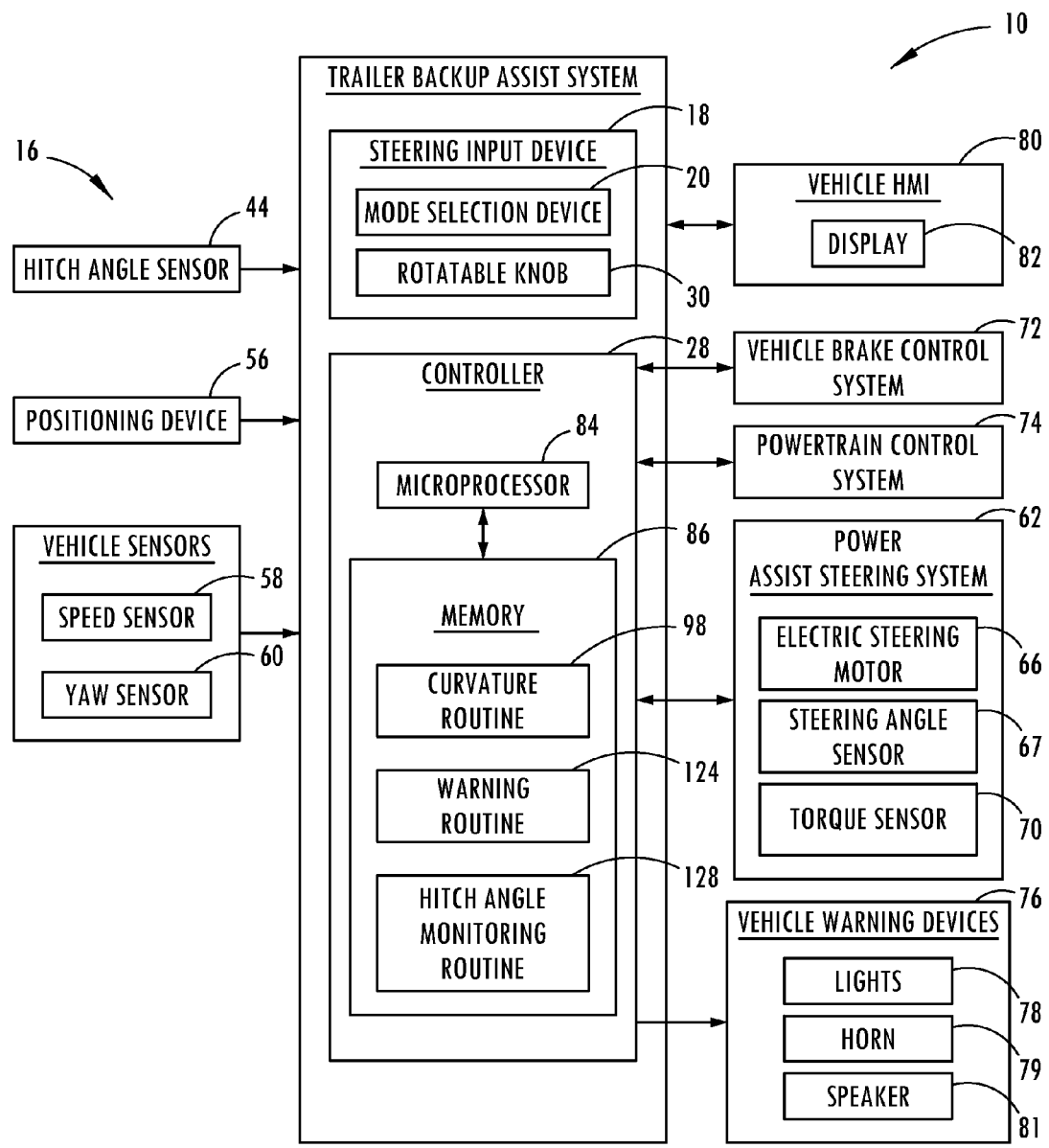
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 provides the sensed hitch angle γ to the trailer backup assist system 10. Similarly, the illustrated embodiment of the trailer backup assist system 10 receives vehicle status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the sensed hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw sensor 60. It is contemplated that in additional embodiments the hitch angle sensor 44 and other vehicle sensors and devices may provide sensor signals or other information, such as proximity sensor signals or successive images of the trailer 12, that a controller of the trailer backup assist system 10 may process with various routines to determine a value or an indicator, such as a hitch angle value or a range of hitch angles.

As further shown in FIG. 2, one embodiment of the trailer backup assist system 10 is in communication with a power assist steering system 62 of the vehicle 14 to operate steered wheels 64 (FIG. 1) of the vehicle 14 for moving the vehicle 14 in such a manner that the trailer 12 reacts in accordance with the desired curvature of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle is sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired backing path 26 and/or desired curvature. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the yaw sensor 60, for use in determining the vehicle steering commands. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. The trailer backup assist system 10 can also issue a warning signal corresponding to a notification of an actual, impending, and/or anticipated unacceptable trailer backup condition, as disclosed in greater detail herein.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices including vehicle warning devices 76 that may be used to alert the driver of the vehicle in a variety of forms. For instance, the vehicle warning devices 76 may utilize the generated warning signal to prompt visual, auditory, and tactile warnings. As such, the vehicle warning devices 76 may include lights 78, such as exterior brake lights and vehicle emergency flashers, as well as interior dash lights and mirror lights. Also, with respect to auditory warnings, the vehicle warning devices 76 may include a vehicle horn 79 and/or a speaker 81 within the vehicle. Additionally, the trailer backup assist system 10 may communicate warnings and other information with a human machine interface (HMI) 80 for the vehicle 14 including a vehicle display 82, such as a center stack mounted navigation/entertainment display (FIG. 1). With respect to a tactile or haptic warning, the vehicle warning devices 76 may include a variety of equipment, such as the steering input device, a driver's seat, and/or other vehicle devices. Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and the target location within a desired target placement zone on display. In addition, the portable device may provide feedback information, such as audible and tactile warnings.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path 26 of travel of the trailer 12 for the controller 28 to process and generate steering commands. Namely, the steering input device 18 provides a desired curvature of the desired backing path 26 of travel of the trailer 12. Also, the trailer steering commands can include information relating to a commanded change in the path of travel, such as a change in radius of the backing path 26 (e.g., the curvature) and information relating to an indication that the trailer 12 is to travel along a path defined by a longitudinal centerline axis of the trailer 12 (i.e., along a substantially straight path of travel or zero curvature). As will be discussed below in more detail, the steering input device 18 according to the illustrated embodiment may include the mode selection device 20 for selecting the longitudinal direction 22 of the trailer 12, the longitudinal direction 24 of the vehicle 14, or the curvature based on the present hitch angle γ or intervention from another steering input device 18, such as the rotatable knob 30. The steering input device 18 in the illustrated embodiment may additionally or alternatively include a rotational control input device for allowing a driver of the vehicle 14 to command desired trailer steering actions or otherwise select the desired curvature. For instance, the rotational control input device may be a rotatable knob 30, which can be rotatable about a rotational axis extending through a top surface or face of the knob. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature or other information defining a desired backing path 26, such as a joystick, depressible buttons, sliding input devices, various controls on a portable device, various user interfaces on a touch-screen display, vision-based systems for receiving gestures, a trajectory planner or other programmable route system, and other conceivable input devices as generally understood by one having ordinary skill in the art.

Still referring to the embodiment shown in FIG. 2, the controller 28 is configured with a microprocessor 84 to process logic and routines stored in memory 86 that receive information from the steering input device 18, the hitch angle sensor 44, the power assist steering system 62, the vehicle brake control system 72, the powertrain control system 74, and other vehicle sensors and devices. As recited above, the controller may process the hitch angle and related information from the hitch angle sensor 44 or other input to generate a warning signal with enough time for the driver to respond to an unacceptable trailer backup condition. Examples of unacceptable trailer backup conditions include, but are not limited to, an over speed condition, a high hitch angle rate, trailer angle dynamic instability, a calculated theoretical trailer jackknife condition, a physical contact jackknife limitation, the trailer 12 or the vehicle 14 approaching physical contact with an object, and the like. It is disclosed herein that the trailer backup assist system 10 can issue an alert signal corresponding to a notification of an actual, impending, and/or anticipated unacceptable trailer backup condition. The controller 28 may additionally or alternatively generate vehicle steering information and commands as a function of all or a portion of the information received from the steering input device 18, the hitch angle sensor 44, the power assist steering system 62, the vehicle brake control system 72, the trailer braking system, the powertrain control system 74, and other vehicle sensors and devices. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a curvature routine 98, a warning routine 124, and a hitch angle monitoring routine 128. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
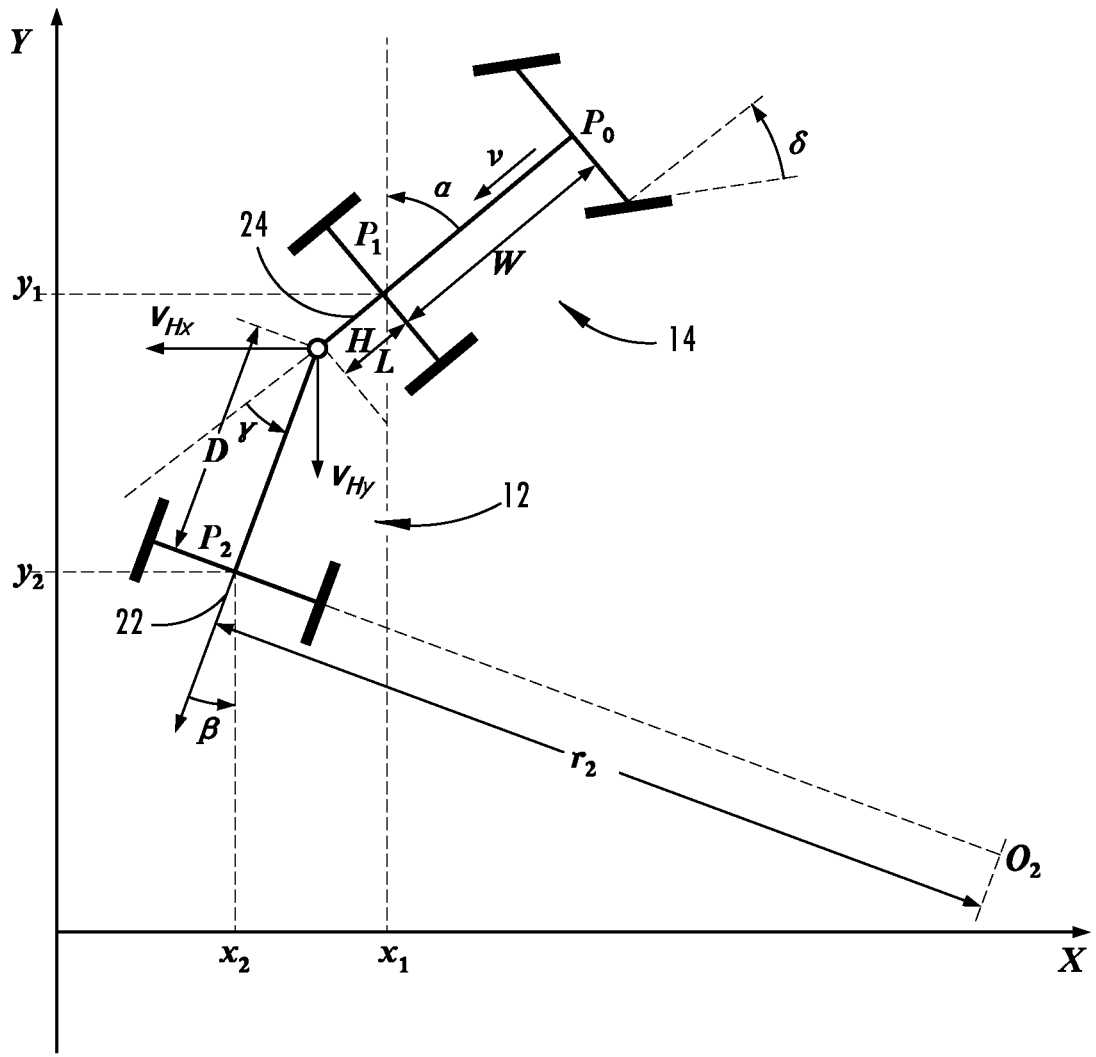
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: length between hitch point and rear axle of the vehicle;
D: distance between hitch point and axle of the trailer or effective axle for a multiple axle trailer (axle length may be an equivalent); and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ is determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue 36 configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
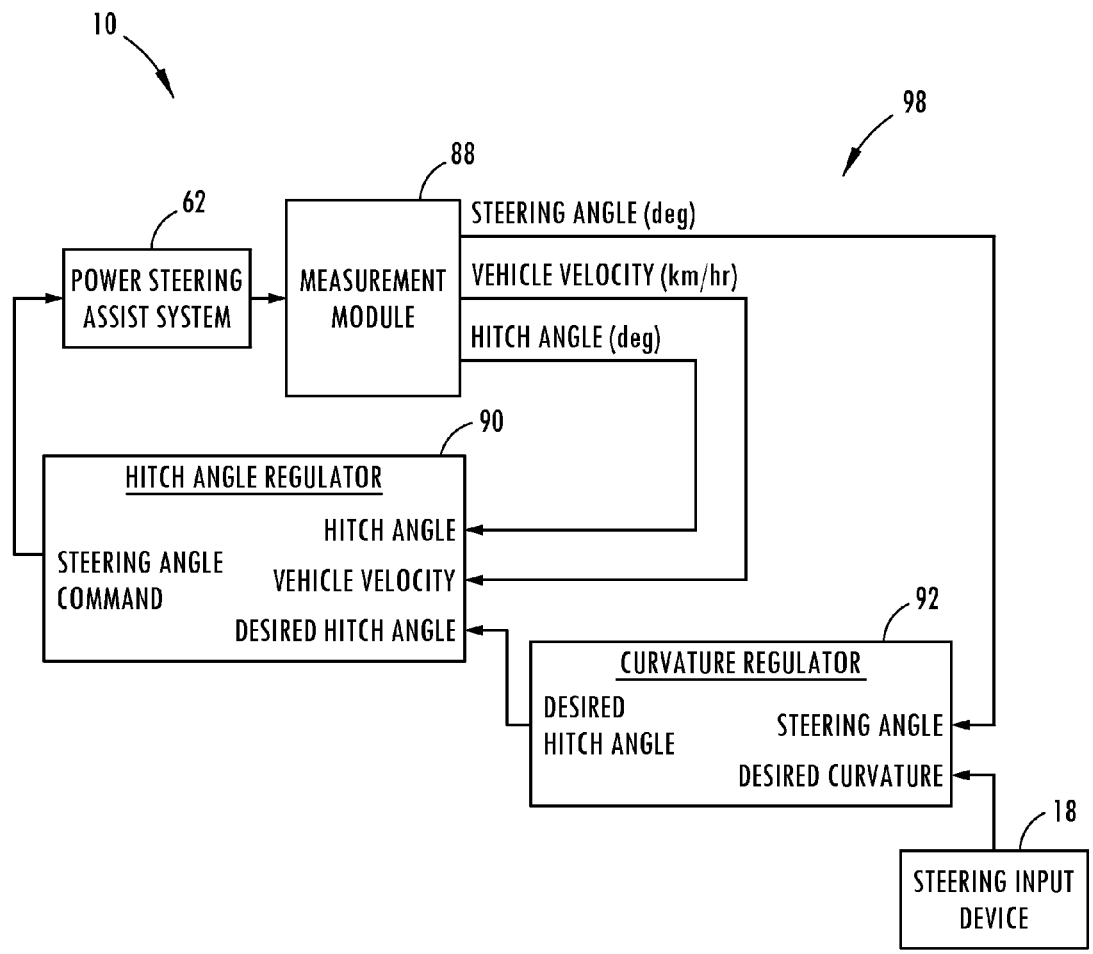
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
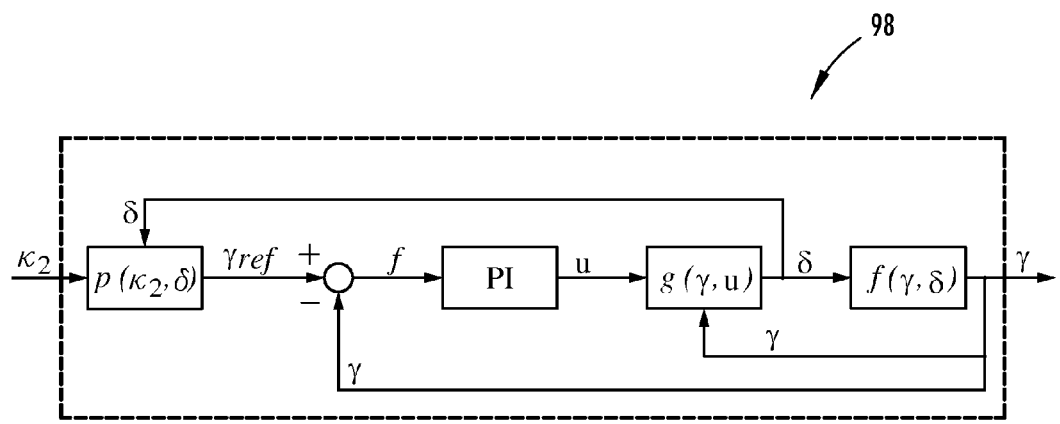
FIG. 5 is schematic block diagram of the curvature controller of FIG. 4, showing the feedback architecture and signal flow of the curvature controller, according to such an embodiment.

As also shown in FIG. 5, the embodiment of the curvature routine 98 shown in FIG. 4 is illustrated in a control system block diagram. Specifically, entering the control system is an input, $\kappa_2$, which represents the desired curvature of the desired backing path 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 58 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Figure 7:
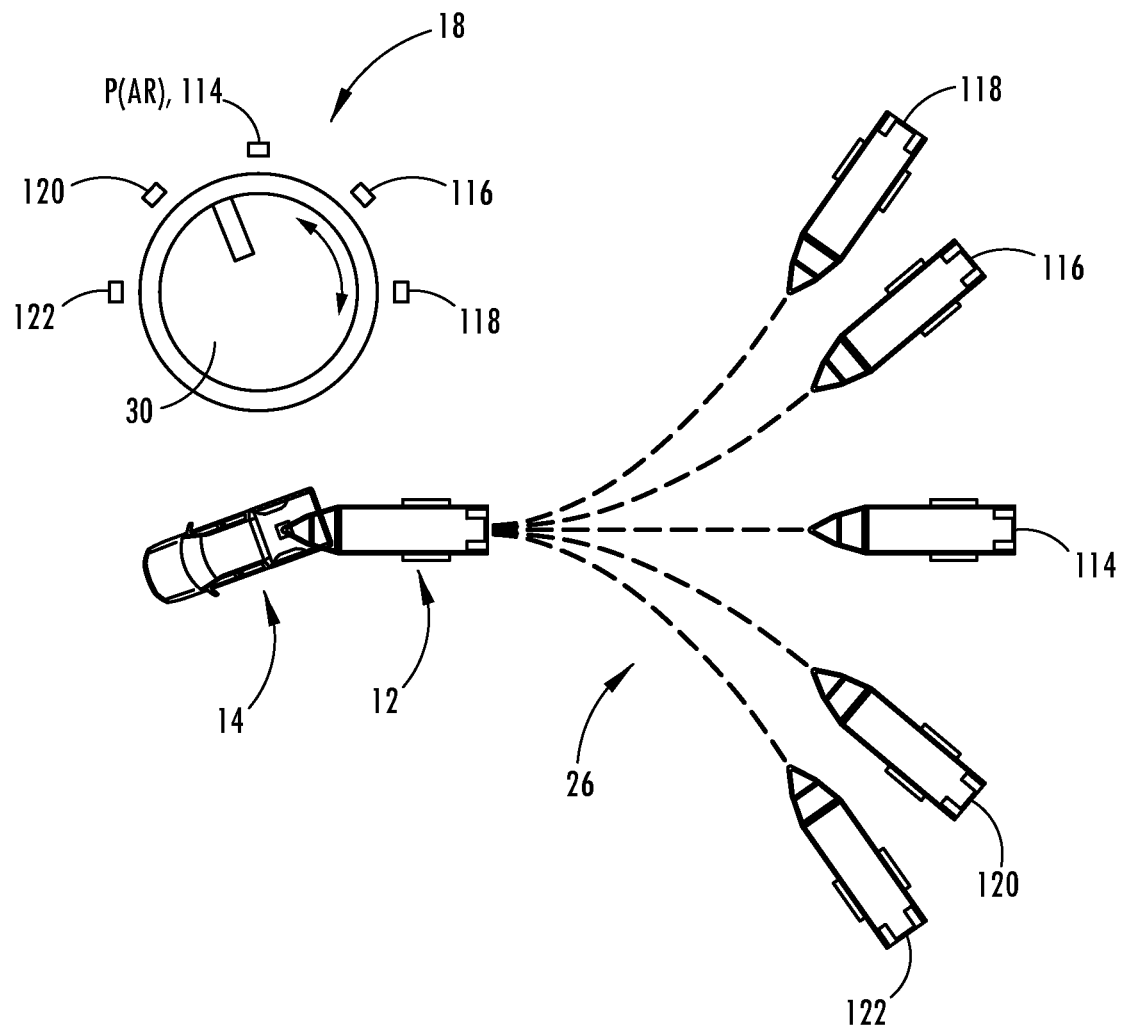
FIG. 7 is a plan view of one embodiment of a rotatable knob for selecting a desired curvature of a trailer and a corresponding schematic diagram illustrating a vehicle and a trailer with various trailer curvature paths correlating with desired curvatures that may be selected.

FIG. 7 shows an example of a trailer path curvature function plot for a steering input device 18 with a degree of rotation of the rotatable knob 30 correlating with the desired curvature of the trailer path. In this example, a curve specifying trailer path curvature relative to user input (e.g., amount of rotation) at a rotary input device (e.g., a knob) is defined by a cubic function. However, a skilled person will appreciate that embodiments of the disclosed subject matter are not limited to any particular function between a magnitude and/or rate of input at a steering input device 18 (e.g., knob rotation) and a resulting trailer path curvature value. The curvature of the trailer 12 as commanded by the steering input device 18 and the trailer backup assist system 10 is described in greater detail below.

Figure 6:
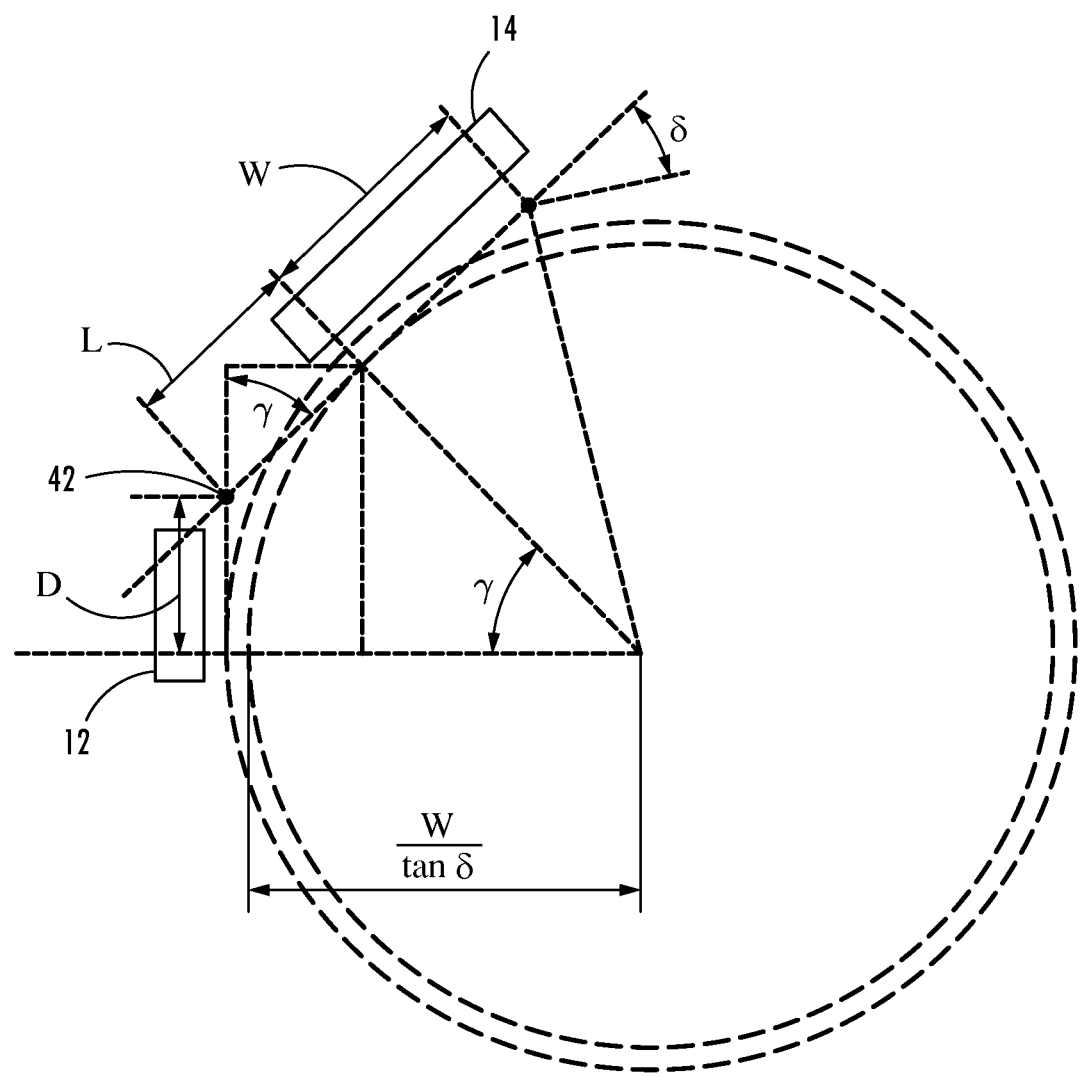
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheel of the vehicle 14, the wheel base W of the vehicle 14, the distance L between hitch point and the rear axle of the vehicle 14, and the length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$. Thus, for limiting the potential for a vehicle/trailer system attaining a jackknife angle, it is preferable to control the yaw angle of the trailer 12 while keeping the hitch angle $\gamma$ of the vehicle/trailer system relatively small.

A kinematic model representation of the vehicle 14 and the trailer 12 can be used to determine a jackknife angle for the vehicle-trailer combination. Accordingly, with reference to FIGS. 3 and 6, a steering angle limit for the steered front wheels requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta(max)$. The steering angle for circular motion with hitch angle $\gamma$ is defined by the following equation.

$$\tan\delta_{max} = \frac{W\sin\gamma_{max}}{D + L\cos\gamma_{max}}$$

Solving the above equation for hitch angle $\gamma$ allows jackknife angle $\gamma(j)$ to be determined. This solution, which is shown in the following equation, can be used in implementing trailer backup assist functionality in accordance with the disclosed subject matter for monitoring hitch angle $\gamma$ in relation to jackknife angle.

$$\cos\bar{\gamma} = \frac{-b \pm \sqrt{b^2 - 4ac}}{2a}$$

where, $a = L^2 \tan^2 \delta(max) + W^2$;

$b = 2 LD \tan^2 \delta(max)$; and $c = D^2 \tan^2 \delta(max) - W^2$.

In certain instances of backing the trailer 12, a jackknife enabling condition can arise based on current operating parameters of the vehicle 14 in combination with a corresponding hitch angle $\gamma$. This condition can be indicated when one or more specified vehicle operating thresholds are met while a particular hitch angle $\gamma$ is present. For example, although the particular hitch angle $\gamma$ is not currently at the jackknife angle for the vehicle 14 and attached trailer 12, certain vehicle operating parameters can lead to a rapid (e.g., uncontrolled) transition of the hitch angle $\gamma$ to the jackknife angle for a current commanded trailer path curvature and/or can reduce an ability to steer the trailer 12 away from the jackknife angle. Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing a hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a warning routine 124 may process the jackknife determining information for determining if the vehicle-trailer combination attained the jackknife enabling condition at the particular point in time and generating a warning signal to alert the driver to take an appropriate action to alleviate the potential jackknife condition.

If it is determined that a jackknife enabling condition is present at the particular point in time, an additional routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still other embodiment, a predefined countermeasure or predefined set of countermeasures may be the applicable countermeasure(s). A countermeasure can be configured to alleviate the jackknife enabling condition using a variety of different strategies. In a vehicle speed sensitive countermeasure strategy, actions taken for alleviating the jackknife enabling condition can include overriding and/or limiting driver requested changes to the radius of curvature of the trailer 12 (e.g., being requested via a steering input apparatus configured in accordance with the disclosed subject matter) as a function of vehicle speed (e.g., via a lookup table correlating radius of curvature limits to vehicle speed). For example, the plurality of potential backing paths that are selectable by the steering input device 18 as the desired backing path 26 may be limited to exclude those with a high curvature values indicative of a jackknife enabling condition. Also, in a countermeasure strategy where trailer curvature requests are limited as a function of speed and driver curvature command transient rates, actions taken for alleviating the jackknife enabling condition can include rate limiting trailer curvature command transients as requested by a driver above a predefined vehicle speed whereas, under the predefined vehicle speed, the as-requested trailer curvature are not rate limited. In a torque limiting countermeasure strategy, actions taken for alleviating the jackknife enabling condition can include application of full available powertrain torque being inhibited when the jackknife enabling condition is present while the vehicle 14 is above a predefined speed and application of full available powertrain torque being allowed when the vehicle speed is reduced below the predefined speed while in the torque inhibiting mode. As opposed to a fixed predefined speed, the torque limiting countermeasure strategy can utilize a speed threshold that is a function of hitch angle γ (i.e., speed threshold inversely proportional to hitch angle acuteness). In a driver accelerator pedal transient detection countermeasure strategy, actions taken for alleviating the jackknife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive countermeasure strategy, actions taken for alleviating the jackknife enabling condition can include using hitch angle rate in a predefined or calculated mapping with current hitch angle position to limit driver requested trailer radius of curvature. Accordingly, in view of the disclosures made herein, a skilled person will appreciate that embodiments of the disclosed subject matter are not unnecessarily limited to a countermeasure strategy of any particular configuration.

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired backing path 26 (i.e. curvature) of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in curvature of a path of a trailer 12 or otherwise selecting a desired backing path 26 during such trailer backup assist.

Referring now to FIG. 7, one embodiment of the steering input device 18 includes a rotatable knob 30. The rotatable knob 30, as illustrated in FIG. 7, is biased (e.g., by a spring return) to an at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may be used to determine the desired curvature output to the controller 28. As will be discussed below in greater detail, the at-rest position P(AR) of the knob corresponds to a movement sensing device signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) each correspond to a respective movement sensing device signal indicating a tightest radius of curvature (i.e., most acute trajectory) of a path of travel of the trailer 12 that is possible without the corresponding vehicle steering information causing a jackknife condition. In this regard, the at-rest position P(AR) is a zero curvature commanding position with respect to the opposing rotational ranges of motion R(R), R(L). Accordingly, a ratio of a commanded curvature of a path of a trailer 12 (e.g., radius of a desired backing path) and a corresponding amount of rotation of the knob can vary (e.g., non-linearly) over each one of the opposing rotational ranges of motion R(L), R(R) of the knob. It is also disclosed therein that the ratio can be a function of vehicle speed, trailer geometry, vehicle geometry, hitch geometry and/or trailer load.

Figure 8:
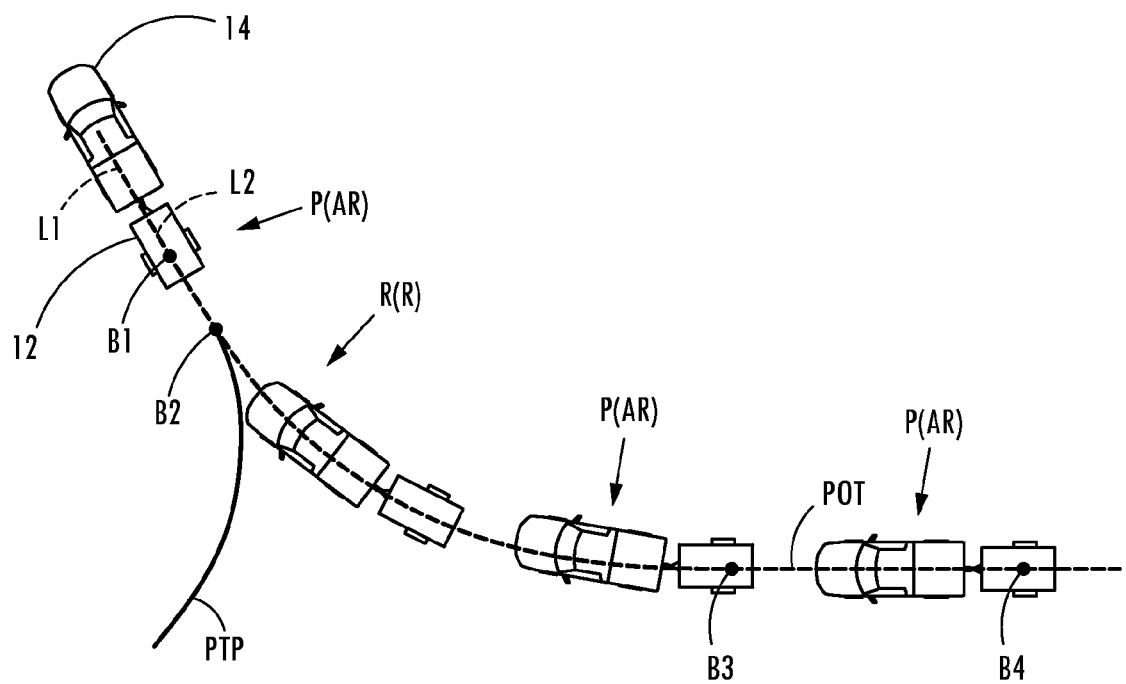
FIG. 8 is a schematic diagram showing a backup sequence of a vehicle and a trailer implementing various curvature selections with the trailer backup assist system, according to one embodiment.

With reference to FIGS. 7-8, as a driver of the vehicle 14 backs the trailer 12, the driver can turn the rotatable knob 30 to provide the a desired curvature or desired backing path 26 for the trailer. According to the embodiment shown in FIG. 7, the steering input device 18 is embodied as a rotatable knob 30 for allowing the driver of the vehicle 14 to command a desired backing path 26 by indicting a desired curvature. In the illustrated embodiment, the rotatable knob 30 rotates about a central axis between a middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature $\kappa_2$ corresponding to a radius of the desired backing path 26 of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired backing path 26 and to override or supplement a mode selection device 20 or another steering input device 18. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

According to some embodiments, the rotatable knob 30 or other steering input device 18 may be configured to provide a tactile or haptic feedback signal (e.g., a vibration through the knob) as a warning if any one of a variety of conditions occur. For instance, conditions to prompt a tactile feedback signal may include the trailer 12 approaching a jackknife angle, the vehicle or the trailer approaching an object 19, the trailer backup assist system 10 having a failure, the trailer backup assist system 10 detecting a fault, the trailer backup assist system 10 or other system of the vehicle 14 has predicted a collision on the present path of travel of the trailer 12, the trailer backup system has restricted a commanded curvature or reduced the available backing paths (e.g., due to excessive speed of the vehicle 14 or due to the proximity of an object 19 in the perimeter field 21), and the like. Still further, it is conceivable that the steering input device 18 can use illumination and/or an audible signal output (e.g. speaker) to provide certain feedback information or warnings, as discussed in more detail below.

Referring again to FIG. 8, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18, such as the mode selection device 20, are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In parallel with or otherwise integrated with performing the operations for receiving the trailer backup assist requests, determining the desired backing path 26 and curvature of the trailer 12, and generating the vehicle steering commands, the trailer backup assist system 10 may perform an operation for monitoring if an unacceptable trailer backup condition exists. Examples of such monitoring include, but are not limited to assessing a hitch angle γ to determine if a hitch angle γ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more wheel speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to an operation for ending the current trailer backup assist. In conjunction with performing the operation for ending the current trailer backup assist, an operation can be performed for controlling movement of the vehicle 14 to correct or limit a jackknife condition (e.g., steering the vehicle 14, decelerating the vehicle 14, limiting magnitude and/or rate of driver requested trailer curvature input, limiting magnitude and/or rate of the steering command, and/or the like to preclude the hitch angle from being exceeded).

Figure 9:
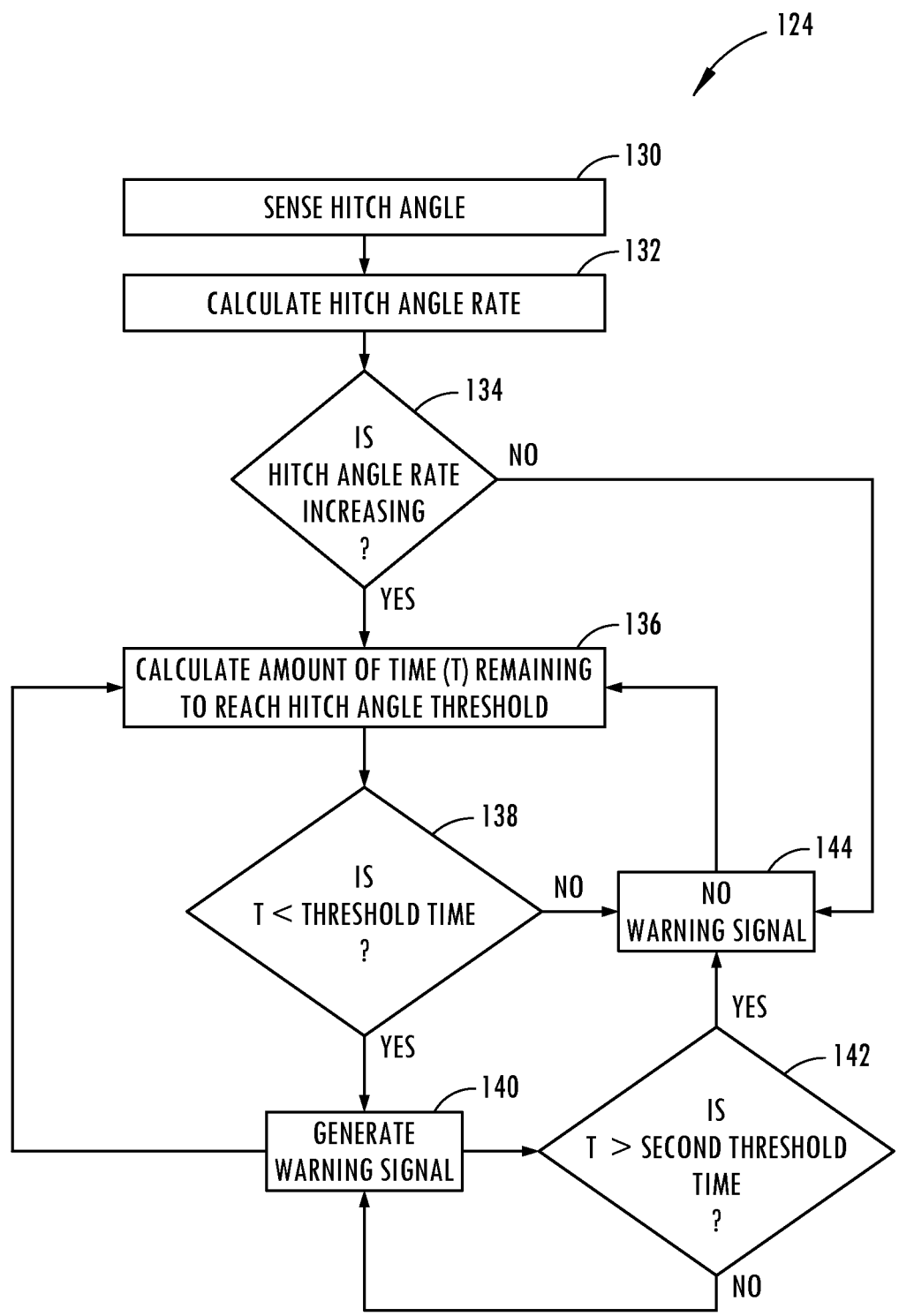
FIG. 9 is a flow diagram illustrating a method for providing a hitch angle warning when operating a trailer backup assist system, according to one embodiment.

Referring now to FIG. 9, the warning routine 124 of the hitch angle warning system is illustrated according to one embodiment. In this embodiment, at step 130, the hitch angle is sensed with the hitch angle sensor 44. The sensed hitch angle is then monitored over time to calculate a hitch angle rate at step 132. It is contemplated that the hitch angle sensor 44 may directly output a hitch angle rate for purposes of the warning routine 124. At step 134, a determination is made as to whether the hitch angle rate is increasing. This determination filters out further processing when there is little hitch angle movement and/or when the vehicle is being steered to move the trailer closer to a zero curvature position, corresponding with the longitudinal set on lines of the vehicle and the trailer being substantially aligned. If it is determined that the hitch angle rate is increasing, at step 136 the warning routine 124 illustrated in FIG. 9 calculates the amount of time remaining before the currently sensed hitch angle reaches and/or exceeds a hitch angle threshold or threshold angle. It is contemplated that the maximum hitch angle controllable by the vehicle, as determined based on a length of the trailer and other variables that define the kinematic relationship described with reference to FIG. 6, such that the hitch angle threshold or threshold angle may be set to substantially equal the calculated maximum hitch angle.

In the embodiment shown in FIG. 9, the amount of time (T) remaining to reach the hitch angle threshold may be calculated with an extrapolation of the hitch angle moving at the present hitch angle rate or a calculation that accounts for the increasing magnitude of the hitch angle rate. The warning routine 124 then proceeds to determine, at step 138, whether the calculated amount of time remaining to reach the hitch angle threshold is less than a threshold time that may be set to correspond with or be greater than the time necessary for a driver to react to a warning signal and make a corrective action. Accordingly, it is contemplated that this threshold time may be a programmable value that is modifiable by the driver or otherwise set as a factory setting. It is also contemplated that the frequency and intensity of the warning signal may increase as the calculated amount of time remaining to reach the threshold angle approaches the threshold time and/or continues to exceed the threshold time. Accordingly, at step 140 the warning signal is generated when it is determined that the calculated amount of time remaining to reach the hitch angle threshold is less than the threshold time.

With continued reference to the embodiment of the hitch angle warning routine 124 shown in FIG. 9, a hysteresis is provided to the warning signal when it is generated to prevent flickering of the warning signal when the calculated amount of time remaining to reach the hitch angle threshold is approximately equal to the threshold time. At step 142, the hysteresis is applied by waiting to deactivate the warning signal at step 144 until the calculated amount of time remaining to reach the hitch angle threshold is greater than a second threshold time that is greater than the threshold time processed at step 136. When the calculated amount of time remaining to reach the hitch angle threshold has exceed the second threshold time the warning signal is deactivated at step 144.

Figure 10:
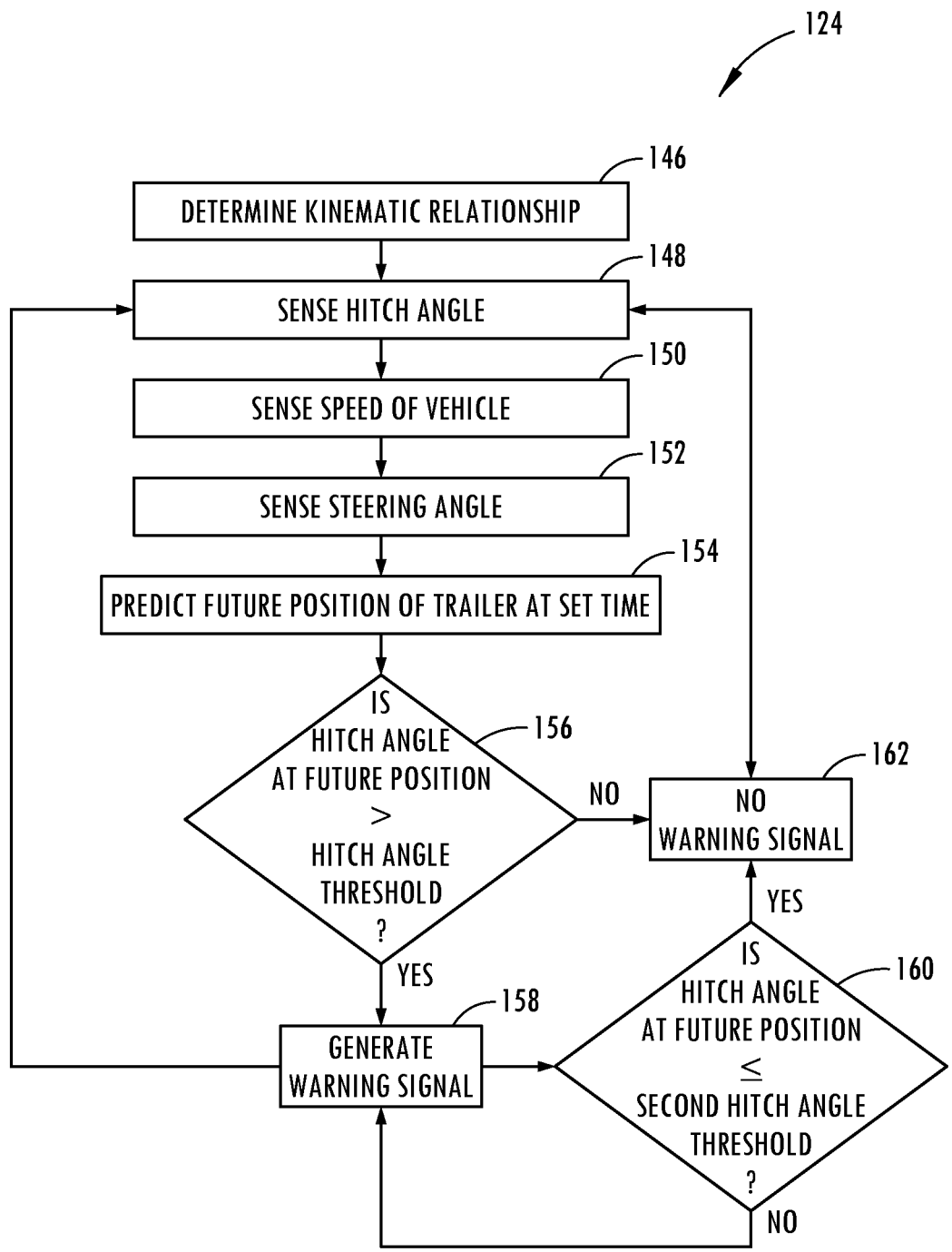
FIG. 10 is a flow diagram illustrating a method for providing a hitch angle warning when operating a trailer backup assist system, according to an additional embodiment.

An additional embodiment of the warning routine 124 is illustrated in FIG. 10 which similarly provides a time based warning signal that is programmable to provide consistent response time for the driver. Specifically, the illustrated embodiment provides at step 146 a determination of the kinematic relationship between the vehicle 14 and the trailer 12. It is contemplated that this step 146 may be alternatively performed by the curvature routine 98 or other routine process by the controller 28. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described.

Upon determining the kinematic relationship, a series of sensing steps, namely sensing the hitch angle at step 148, sensing the speed of the vehicle at step 150, and sensing the steering angle at step 152. It is conceivable that these steps may be performed in parallel or an alternative sequence from that of the illustrated embodiment. With at least the sensed hitch angle, at step 154 the future position of the trailer 12 is predicted at a set time, such as three seconds from the present time. With the predicted future position, at step 156 a determination is made as to whether the corresponding hitch angle of the future position is greater than a threshold hitch angle. Again, the threshold hitch angle may be equal or substantially equal to a maximum hitch angle controllable by a vehicle 14 based on a length of the trailer 12 and other variables of the kinematic relationship. If it is determined that the future position exceeds the hitch angle threshold, at step 158 the warning signal is generated to the driver. Accordingly, the set time to predict the future position may be programmable to correspond with the drivers desired reaction time such that the driver is consistently provided with a warning signal with enough time to react and make a corrective action to avoid exceeding the hitch angle threshold or other undesirable conditions associated with the angle threshold programmed for the warning routine 124.

As also shown in the embodiment illustrated in FIG. 10, hysteresis is provided to prevent the warning signal from flickering. In this embodiment the hysteresis at step 160 is embodied with a determination as to whether the calculated future position has a hitch angle less than a second angle threshold that is less than the hitch angle threshold processed at step 156. With the positive indication at step 160, the warning signal is deactivated at step 162.

Figure 11:
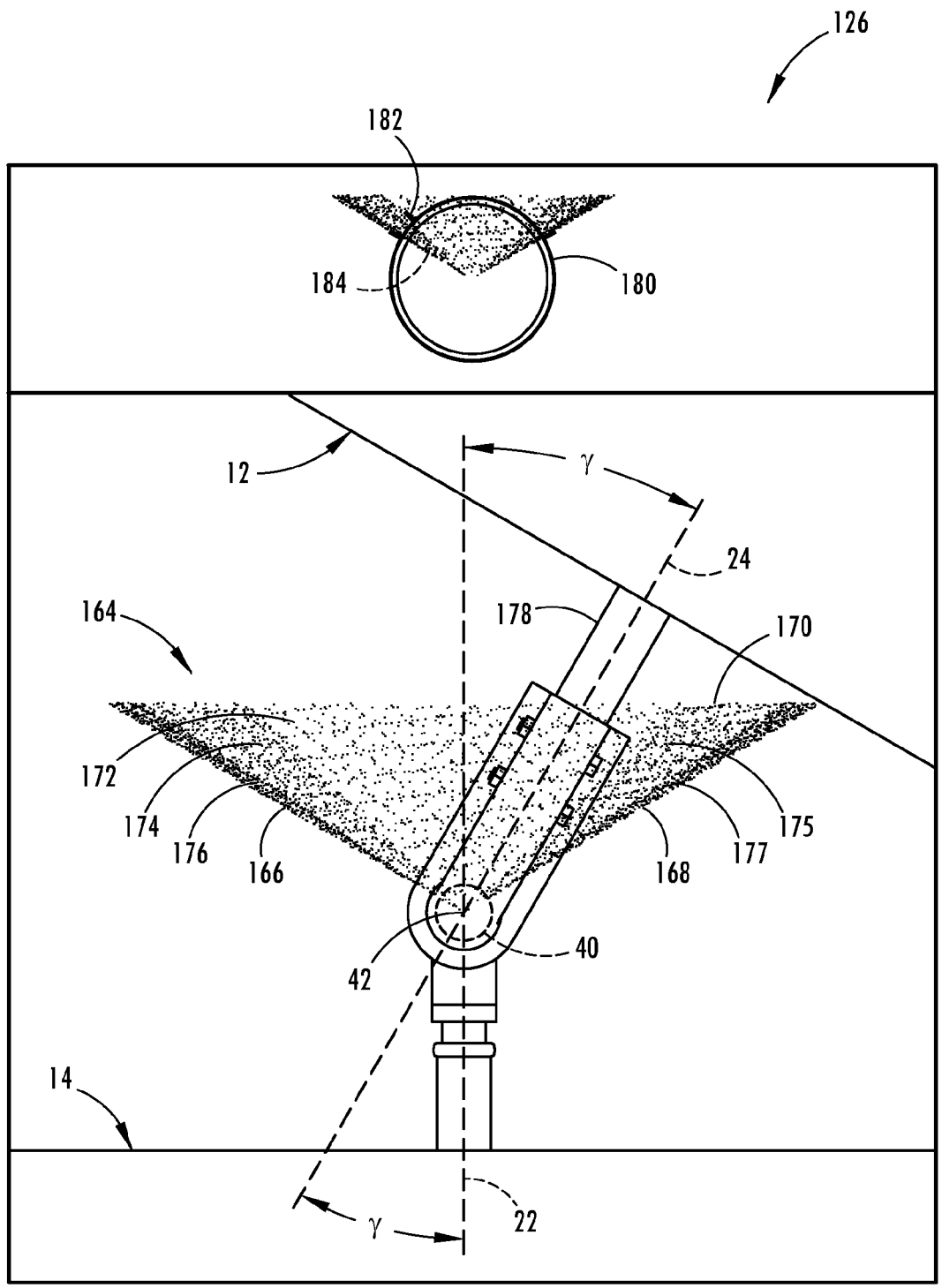
FIG. 11 is a diagram of an imaged scene showing a tow vehicle and a trailer being backed along a curved path in a clockwise direction.

To provide a visual indication of the hitch angle γ, FIG. 11 shows one embodiment of an imaged scene 126 of a trailer hitch connection between the vehicle 14 and the trailer 12. This imaged scene 126 is generated as a result of the controller 28 processing one embodiment of the hitch angle warning routine 124 (FIG. 2). More specifically, an overlay 164 may be super imposed on the imaged scene 126 and configured as an inverted triangle defined by a first boundary line 166, a second boundary line 168, and a third boundary line 170. As shown, the first and second boundary lines 166, 168 meet at a point 42 coinciding with a central area of the image trailer hitch connection and extending upward and outwardly therefrom in opposite directions before being joined to an end of the third boundary line 170, which extends horizontally across the imaged scene 126. With respect to the illustrated embodiment, the overlay 164 may be separated into a plurality of triangular regions that may include a central region 172, outer regions 174 and 175, and outermost regions 176 and 177. The position and dimensions of the overlay 164 may be determined by the controller 28 based on vehicle related information, camera related information, and/or trailer related information. While the overlay 164 and the accompanied regions 172-177 have been shown and described herein as being triangular, it should be appreciated that other shapes may be used for accomplishing the same.

Figure 12:
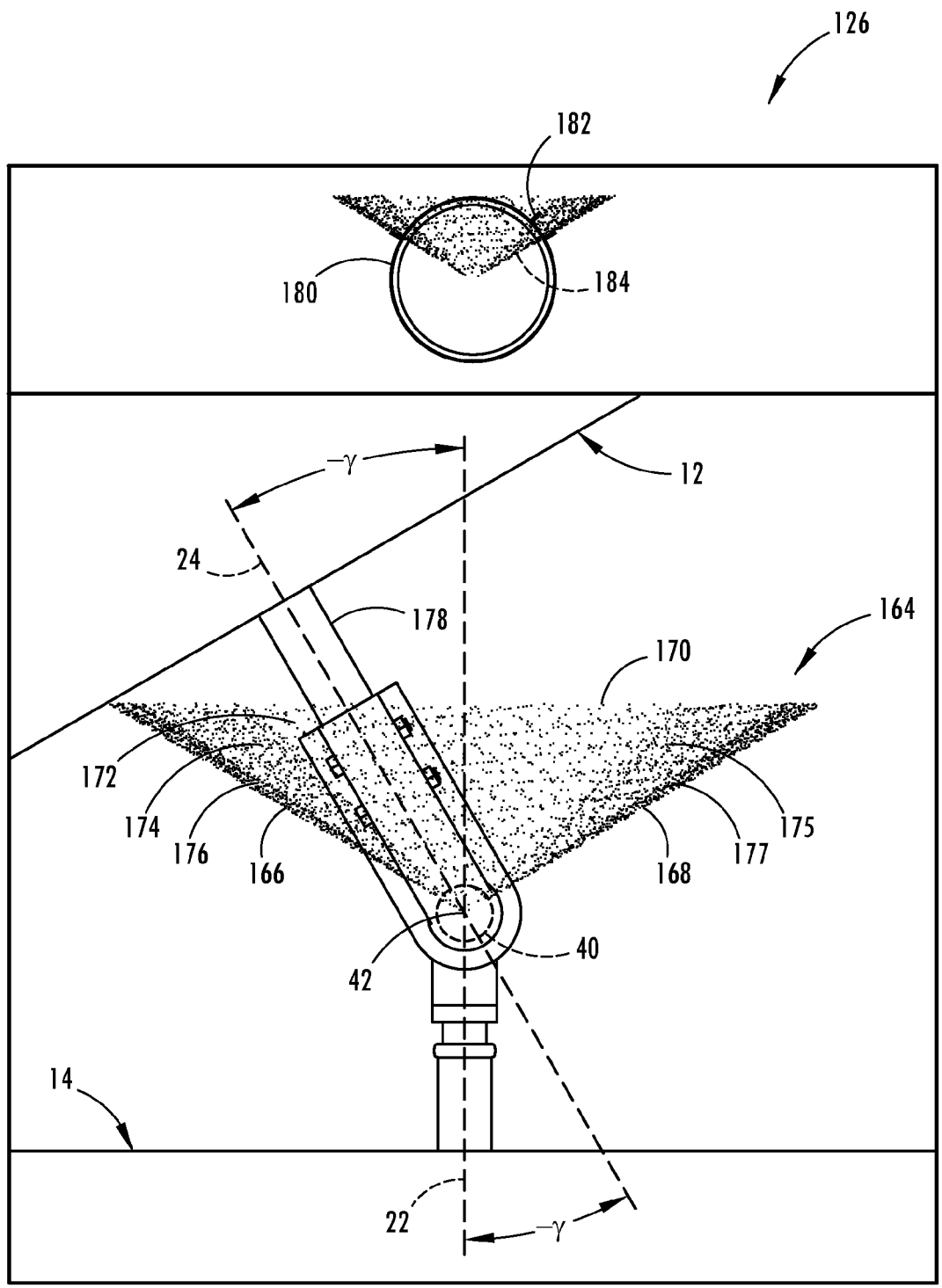
FIG. 12 is a diagram of an imaged scene showing a tow vehicle and a trailer being backed along a curved path in a counterclockwise direction.

According to one embodiment, each region 172-177 of the overlay 164 may encompass one or more hitch angle positions, each corresponding to an angular position of a centerline longitudinal axis 24 of the trailer 12 relative to a fixed centerline longitudinal axis 22 of the vehicle 14. Generally, the centerline longitudinal axis 22 of the vehicle 14 coincides with the centerline longitudinal axis 24 of the trailer 12 when the vehicle 14 is aligned with the trailer 12, which typically occurs prior to performing a backup maneuver. Subsequently, when a backup maneuver is performed, the hitch angle position tends to be static when the backup maneuver occurs along a straight path or dynamic when the backup maneuver occurs along a curved path. For instance, the imaged scene 126 shown in FIG. 11 may be captured while the vehicle 14 and trailer 12 are being backed along a curved path in a clockwise direction (i.e. the tow vehicle 14 is steered to the left), which is manifested in the imaged scene 126 as a clockwise angular displacement of the centerline longitudinal axis 24 of the trailer 12 about point 42. Conversely, the backing of the vehicle 14 and trailer 12 along a curved path in a counterclockwise direction (i.e. the vehicle 14 is steered to the right) is manifested as a counterclockwise angular displacement of the centerline longitudinal axis 24 of the trailer 12 about point 42, as exemplarily shown in FIG. 12. In either case, a hitch angle γ describes the angular displacement of the centerline longitudinal axis 24 of the trailer 12 relative to the centerline longitudinal axis 22 of the vehicle 14 and generally increases positively with increasing path curvature in a clockwise direction (FIG. 11) or increases negatively with increasing path curvature in a counterclockwise direction (FIG. 12).

With respect to the illustrated embodiment, the central region 172 is symmetric about the centerline longitudinal axis 22 of the vehicle 14 and encompasses hitch angle positions having relatively small hitch angles γ in both the positive and negative directions. Outer regions 174 and 175 share mirror symmetry about the centerline longitudinal axis 22 of the vehicle 14 and encompass hitch angle positions having greater hitch angles in the positive and negative directions than those of the central region 172. Lastly, outermost regions 176 and 177 also share mirror symmetry about the centerline longitudinal axis 22 of the vehicle 14 and encompass hitch angle positions having the greatest hitch angles in both the positive and negative directions.

According to one embodiment, the outermost regions 176, 177 of the overlay 164 are each indicative of a suggested hitch angle position limit. The hitch angle position limit is not limited to any particular hitch angle value or set of values. In one implementation, the hitch angle position limit may correspond to an operational limit of a vehicle system such as, but not limited to, the trailer backup assist system 10. For instance, the hitch angle position limit may encompass a maximum hitch angle γ that may be achieved by the steering system of the vehicle 14. In another instance, the hitch angle position limit may encompass a maximum hitch angle γ at which the target 52 disposed on the trailer 12 can be accurately detected by the imaging device 46. In yet another instance, the hitch angle position may encompass a maximum hitch angle γ before a potential jackknife condition is encountered. In any event, to provide greater visual impact, the overlay 164 may be generated as a color scale and each region 172-177 of the overlay 164 may be visually distinguished via a color associated therewith. According to one embodiment, the central region 172 may be distinguished using a green color, whereas outer regions 174, 175 may be distinguished using a yellow color and outermost regions 176 and 177 may be distinguished using a red color. However, it should be appreciated that the overlay 164 may be represented using only the outermost regions 176, 177.

To enable a driver of the towed vehicle 14 to monitor the hitch angle between the tow vehicle 14 and the trailer 12, the hitch angle monitoring routine 128 generates a hitch angle position indicator 178 that visually relates the current hitch angle position to the hitch angle position limit. For purposes of illustration, the hitch angle position indicator 178 is shown in FIGS. 11 and 12 as a trailer tongue but may include other visible imaged objects. When selecting the hitch angle position indicator 178, it may be advantageous to use imaged objects that both coincide with the centerline longitudinal axis 24 of the trailer 12 and move within the overlay 164 in a consistent manner therewith. Further, if using an overlay 164 generated as a color scale, the color scale should not be so bright as to prevent a driver from seeing the trailer tongue or other imaged object serving as the hitch angle position indicator 178.

With respect to the illustrated embodiments shown in FIGS. 11 and 12, the hitch angle position indicator 178 coincides with the centerline longitudinal axis 24 of the trailer 12. In this configuration, the hitch angle position indicator 178 is equidistant from each of the outermost regions 176, 177 when the centerline longitudinal axis 24 of the trailer 12 coincides with the centerline longitudinal axis 22 of the tow vehicle 14 and is angularly displaced either towards outermost region 176 or outermost region 177 when the hitch angle γ increases in either a negative direction or a positive direction, respectively. Thus, by tracking the position of the hitch angle position indicator 178 within the overlay 164, a driver of the tow vehicle 14 can quickly ascertain the current hitch angle position in relation to the hitch angle position limit.

Additionally or alternatively, the hitch angle position indicator 178 may be represented as a virtual object. According to one embodiment employing a color cast, the processor 84 may vary the brightness of the overlay 164 based on the current hitch angle position of the tow vehicle 14 and the trailer 12. For example, the current hitch angle position is shown in FIG. 11 as contained within the central region 172 of the overlay 164. In that instance, the central region 172 or portion thereof (e.g. the right half) may be made to glow brighter in color than the other regions 174-177. Alternatively, the brightness of the central region 172 or portion thereof may remain the same while the brightness of the other regions 174-177 is reduced or eliminated altogether. In either embodiment, the processor 84 can determine in which region 172-177 the current hitch angle position is located based on hitch angle measurements supplied thereto from the hitch angle sensor 44, which may indicate both the hitch angle γ and heading relative to the centerline longitudinal axis 22 of the tow vehicle 14. By using hitch angle measurements to determine the current hitch angle position, the overlay 164 may be superimposed elsewhere on the imaged scene 126.

As previously mentioned, the warning signal generated by the warning routine 124 may be provided to the driver in various forms, such as with the vehicle warning devices 76 and/or the vehicle HMI 80. In the event that the current hitch angle position nears, reaches, and/or exceeds the hitch angle position limit, the warning routine 124 may generate a warning signal. The warning signal may be used to alert the driver of the tow vehicle 14 in a variety of forms. For instance, the warning signal may prompt a visual warning that includes flashing the outermost regions 176, 177 of the overlay 164. Additionally or alternatively, the warning signal may be sent to a vehicle audio system to prompt an auditory warning to the driver of the tow vehicle 14. Additionally or alternatively still, the warning signal may prompt a haptic warning, achievable in a variety of equipment such as, but not limited to, the steering input device 18, a driver seat, and/or a smartphone or other portable electronic device.

Referring still to FIGS. 11 and 12, the hitch angle monitoring routine 128 may be further configured to superimpose a virtual steering input device 180 on the imaged scene 126 that mimics the physical characteristics and behavior of an actual steering input device 18 of the trailer backup assist system 10, such as the rotatable knob 30 shown in FIG. 2. According to one embodiment, the virtual steering input device 180 is positioned on the imaged scene 126 above the overlay 164 and may include a virtual steering angle position indicator 182 that reflects the actual position of the rotatable knob 30. As shown in FIG. 11, the position of the virtual steering angle position indicator 182 indicates that the knob 30 has been turned counterclockwise from the at-rest position to steer the vehicle 14 to the left, thereby causing the vehicle 14 and trailer 12 to back along a curved path in a clockwise direction. As shown in FIG. 12, the position of the virtual steering angle position indicator 182 indicates that the rotatable knob 30 has been turned clockwise from the at-rest position, thereby causing the vehicle 14 and trailer 12 to back along a curved path in a counter clockwise direction. Additionally, the virtual steering input apparatus 180 may indicate a steering angle position limit 184 of the rotatable knob 30, which may be a suggested limit or correspond to one or more fixed end stops of the knob 30, if applicable. When the steering angle position limit 184 is neared, reached, or exceeded, the processor 84 may generate a signal used to elicit a visual, auditory, and/or haptic response. It should be appreciated that a color scale similar to the one described for the overlay 164 may be used for representing a plurality of steering angle positions if desired.

Figure 13:
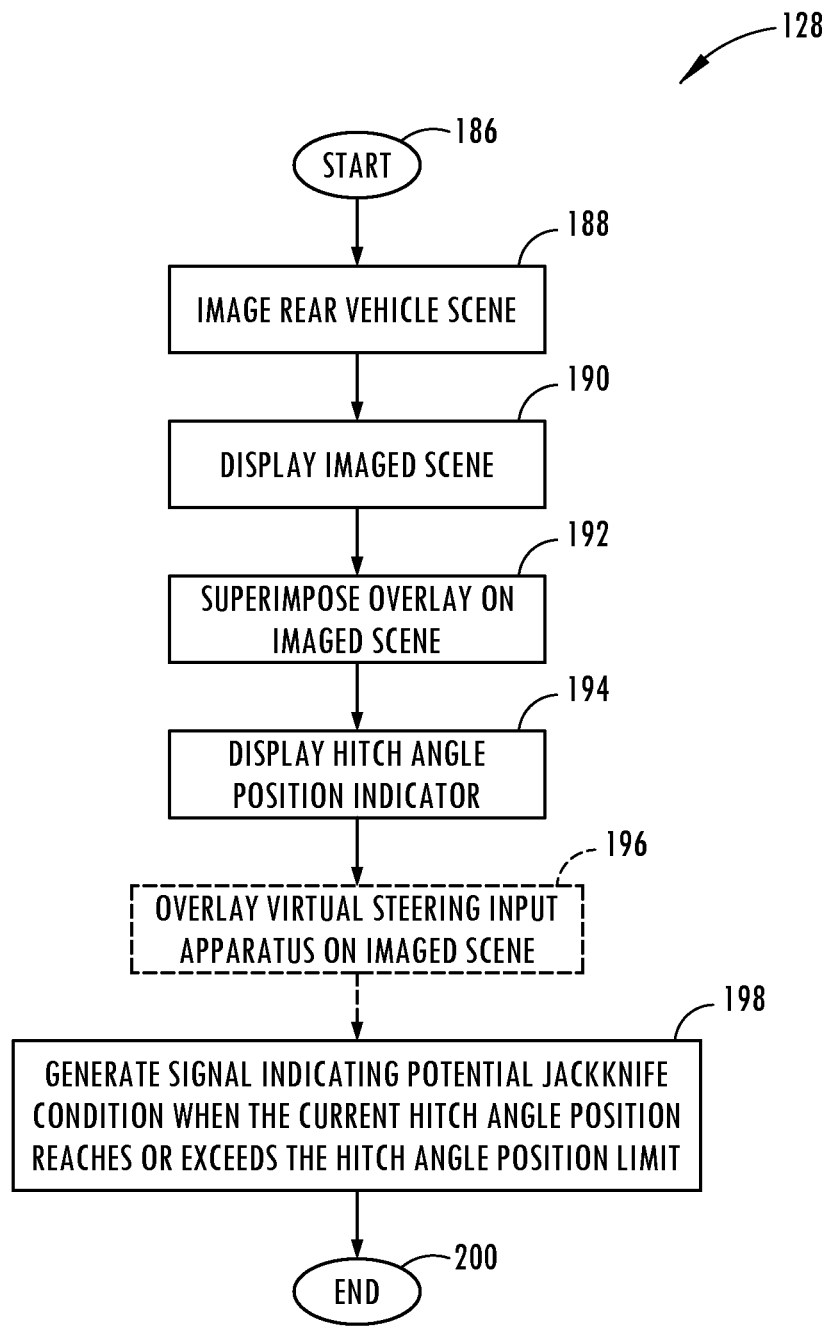
FIG. 13 is a flow chart of a hitch angle monitoring method, according to one embodiment.

Referring to FIG. 13, a flow diagram for a method of executing the hitch angle monitoring routine 128 is shown, according to one embodiment. The method may be embodied as a routine stored in the memory 86 of the controller 28 and executed by the processor 84. The routine may start in step 186 when a tow vehicle 14 is placed in park or reverse. In step 188, the camera 46 images a rear vehicle scene. In step 190, the imaged scene 126 is displayed on a display 82 of the trailer backup assist system 10. In step 192, the routine superimposes an overlay 164 on the imaged scene 126 that indicates a hitch angle position limit between the tow vehicle 14 and the trailer 12. In step 194, a hitch angle position indicator 178 is displayed on the display 82 and identifies a current hitch angle position in relation to the hitch angle limit position. In step 196, the routine may optionally generate a virtual steering input apparatus 180 that is overlaid on the imaged scene 126 and mimics the physical characteristics and behavior of an actual steering input device 18 of a trailer backup assist system. In step 198, the routine generates a warning signal when the current hitch angle position reaches or exceeds the hitch angle position limit. Once the tow vehicle 14 is placed in drive or the ignition is turned OFF, the routine may end in step 200.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch angle warning system, comprising:
a hitch angle sensor sensing a current hitch angle between a vehicle and a trailer; and
a controller determining a future position of the trailer at a set time based on the current hitch angle and a speed of the vehicle and generating a warning signal when the future position exceeds a hitch angle threshold, wherein the future position is determined based on a length of the trailer, such that shorter length trailers will cause the warning signal to be generated before longer length trailers.

2. The hitch angle warning system of claim 1, further comprising:
a display for showing a visible warning when the warning signal is generated.

3. The hitch angle warning system of claim 1, further comprising:
a speaker for generating an audible warning when the warning signal is generated.

4. The hitch angle warning system of claim 1, wherein the future position is determined based on the speed of the vehicle.

5. The hitch angle warning system of claim 1, wherein the future position is determined based on the speed and a steering angle of the vehicle.

6. The hitch angle warning system of claim 1, wherein the future position includes a future hitch angle corresponding with a longitudinal centerline of the trailer in the future position.

7. The hitch angle warning system of claim 1, wherein the controller determines a maximum hitch angle controllable by the vehicle based on a length of the trailer, and wherein the hitch angle threshold is equal to the maximum hitch angle.

8. The hitch angle warning system of claim 1, wherein the controller generates a steering command for the vehicle to guide the trailer on a desired curvature based on a kinematic relationship between the vehicle and the trailer, wherein the desired curvature is defined with a steering input device.

9. A hitch angle warning system, comprising:
a hitch angle sensor sensing a hitch angle between a vehicle and a trailer; and
a controller estimating an amount of time for the hitch angle to reach a threshold angle based on a rate of change of the hitch angle and generating a warning signal when the amount of time is less than a threshold time.

10. The hitch angle warning system of claim 9, wherein the rate of change of the hitch angle is determined based on repetitively sensing the hitch angle over time.

11. The hitch angle warning system of claim 9, wherein the threshold time is configured to be greater than a response time of a driver of the vehicle.

12. The hitch angle warning system of claim 9, wherein the warning signal is deactivated when the amount of time is greater than a second time that is greater than the threshold time.

13. The hitch angle warning system of claim 9, further comprising:
a display for showing a visible warning when the warning signal is generated.

14. The hitch angle warning system of claim 9, further comprising:
a speaker for generating an audible warning when the warning signal is generated.

15. The hitch angle warning system of claim 9, wherein the amount of time for the hitch angle to reach the threshold angle is determined based on at least one of a speed of the vehicle, a steering angle of the vehicle, and a length of the trailer.

16. The hitch angle warning system of claim 9, wherein the controller determines a maximum hitch angle controllable by the vehicle based on a length of the trailer, and wherein the threshold angle is substantially equal to the maximum hitch angle.

17. A method for providing a hitch angle warning, comprising:
reversing a vehicle with a trailer attached;
sensing a hitch angle between the vehicle and the trailer;
determining an amount of time for the hitch angle to reach a threshold angle; and
generating a warning signal when the amount of time is less than a threshold time.

18. The method of claim 17, wherein the amount of time for the hitch angle to reach the threshold angle is determined based on a rate of change of the hitch angle.

19. The method of claim 18, further comprising:
determining a maximum hitch angle controllable by the vehicle based on a length of the trailer, and wherein the threshold angle is substantially equal to the maximum hitch angle.

* * * * *